Figure 1:
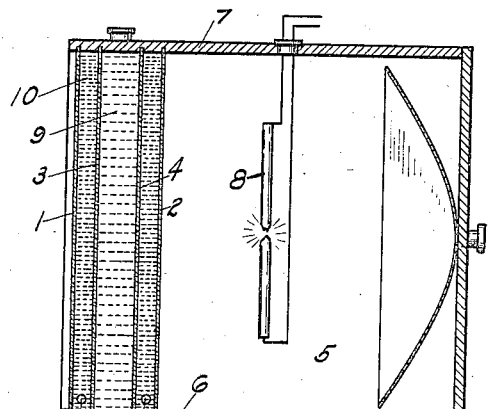

W. FREY.
COLOR FILTER.
APPLICATION FILED MAY 14, 1915.

1,174,930.

Patented Mar. 7, 1916.

INVENTOR:
William Frey,
BY
Chamberlin & Freudenreich
ATTORNEYS.

UNITED STATES PATENT OFFICE.

WILLIAM FREY, OF ZURICH, SWITZERLAND, ASSIGNOR, BY MESNE ASSIGNMENTS, TO MEYERCORD PROCESS PLATE COMPANY, OF CHICAGO, ILLINOIS, A CORPORATION OF ILLINOIS.

COLOR-FILTER.

1,174,930.   Specification of Letters Patent.   Patented Mar. 7, 1916.

Application filed May 14, 1915. Serial No. 28,173.

*To all whom it may concern:*

Be it known that I, WILLIAM FREY, a citizen of Switzerland, residing at Zurich, in the Republic of Switzerland, have invented a certain new and useful Improvement in Color-Filters, and declare the following to be a full, clear, and exact description of the same, such as will enable others skilled in the art to which it pertains to make and use the same.

My invention relates to the art of multicolored printing and particularly to the production of negatives from which the color plates are made, and has for its object to make it possible to secure cleaner and sharper negatives and a more perfect color separation than heretofore, in a much simpler manner and more cheaply than by the old processes, and, further, to secure more perfect registration of the color plates than has heretofore been possible.

Viewed in one of its aspects my invention may be regarded as comprising a novel process of making negatives for use in producing color plates claimed in my application Serial No. 859,170, filed Aug. 29, 1914, while in another aspect it may be regarded as comprising novel means for producing such negatives.

The process which is now universally employed consists in exposing the subject to an intense light and photographing the subject through a color filter which is placed between the subject and the sensitive plate. In this process every ray of light that travels from the subject to the sensitive plate in the camera must first pass through the filter, the result being that a long exposure is necessary, and the obtaining of a clean and sharp negative is extremely difficult and a highly technical operation. The longer the exposure, the more expensive the process is, of course, because of the powerful light and costly plates required. The tendency of the filter to obscure the subject makes it necessary to employ expensive lenses in order that reasonably successful results may be obtained. Any imperfection in the filter is photographed along with the subject and this, together with the lack of registration in the negative necessitates considerable retouching of the printing plates.

In accordance with my invention I eliminate the color filter between the subject and the sensitive plate and photograph the subject while it is exposed to light of a color corresponding to the color of the filter heretofore employed. Specifically considered, therefore, the invention of the present application may be regarded as having for its object to produce a simple and novel means for projecting a powerful light of any desired color.

Figure 2:
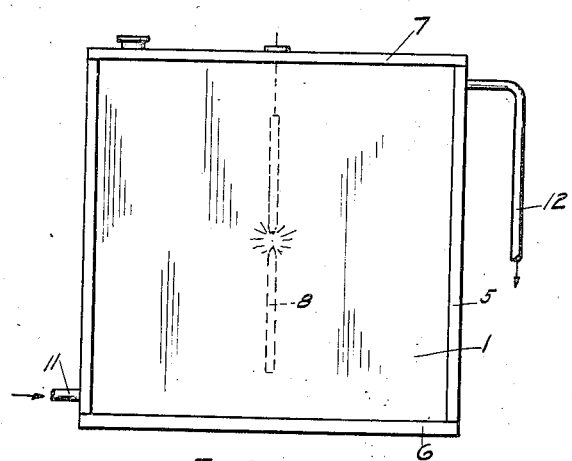

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a vertical section through a light-projecting apparatus arranged in accordance with the present invention; and Fig. 2 is a front elevation of the apparatus.

In order to obtain an effective illumination of a subject to be photographed it is necessary that a powerful light, such as an electric arc light, be employed; and the heat from such a powerful source of illumination, placed close to the filter, makes it necessary to provide means for protecting the filter against overheating. In carrying out my invention I make use of filters having double walls of glass, filling the filters with suitably colored liquid and passing a transparent cooling fluid through the double walls for the purpose of keeping the filters cool. In other words, the filter may be made of two containers, arranged one within the other, there being sufficient difference in size between the containers to leave a space between all or some of the corresponding walls; the inner container being filled with the colored liquid and the outer container receiving the cooling medium. Corresponding walls on at least two opposed sides of the containers are made of glass in order to permit light to pass from the source of illumination through the filter and to the subject. For convenience I prefer to make the filter a front wall of a housing or casing in which the source of illumination is located so that when the apparatus is set up in a dark chamber the subject to be photographed will be exposed to light the color of which is determined by the color of the liquid in the filter.

In the drawing I have illustrated the filter as made up of four sheets of glass, 1, 2, 3 and 4, arranged in spaced parallel relation to each other in the front end of a suitable casing or housing, 5, and joined to the surrounding walls of the casing or housing by tight joints which may be of the character shown in Fig. 1 between the glass sheets and the bottom and top walls, 6 and 7, of the casing or housing. In the casing or housing behind the filter is an arc lamp, 8. The space between the plates or sheets, 3 and 4, is filled with a liquid, 9, of the color desired for the filter. The space between the plates 1 and 2 and the two inner plates is filled with clear water which may enter at the bottom on one side through pipes, 11, and overflow at the top at the other side through suitable pipes, 12; thus maintaining a constant circulation through the filter which will conduct away the heat and prevent the filter from being injured.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. An apparatus for illuminating subjects to be photographed comprising a plane lens divided into a plurality of adjacent chambers extending entirely across the lens, a colored liquid within one of said chambers, a cooling medium in the remaining chambers, an arc light behind the lens, and inclosing means for preventing the exit of the rays from the arc light except through said lens.

2. An apparatus for illuminating subjects to be photographed comprising a plane lens in the form of a container having at least one of its walls hollow, a colored liquid within the container, a cooling medium in the interior of said hollow wall, an arc light behind said lens, and an opaque housing extending from the edges of the lens around the lamp.

In testimony whereof I sign this specification in the presence of two witnesses.

WILLIAM FREY.

Witnesses:
  CARL GUBLER,
  AUGUST KRIEGG.